US008867086B2

(12) United States Patent
Mima (10) Patent No.: US 8,867,086 B2
(45) Date of Patent: Oct. 21, 2014

(54) INFORMATION PROCESSING APPARATUS, CONTROL METHOD THEREFOR, AND COMPUTER-READABLE STORAGE MEDIUM

(71) Applicant: Canon Kabushiki Kaisha, Tokyo (JP)

(72) Inventor: Tsuyoshi Mima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/090,384

(22) Filed: Nov. 26, 2013

(65) Prior Publication Data
US 2014/0160531 A1 Jun. 12, 2014

(30) Foreign Application Priority Data

Dec. 7, 2012 (JP) ................................. 2012-268806

(51) Int. Cl.
*G06K 15/00* (2006.01)
*H04N 1/00* (2006.01)

(52) U.S. Cl.
CPC ................................ *H04N 1/00965* (2013.01)
USPC ....... 358/1.16; 358/1.13; 358/1.14; 358/1.15; 358/1.17; 716/138; 716/100; 716/119; 713/323; 718/100; 710/18

(58) Field of Classification Search
None
See application file for complete search history.

(56) References Cited

U.S. PATENT DOCUMENTS

| 5,253,077 | A | * | 10/1993 | Hasegawa et al. ............. 358/404 |
| 6,046,817 | A | * | 4/2000 | Brown et al. ................. 358/1.16 |
| 8,681,807 | B1 | * | 3/2014 | Zimerman ..................... 370/429 |
| 2009/0244621 | A1 | * | 10/2009 | Young et al. .................. 358/1.16 |
| 2012/0018885 | A1 | | 1/2012 | Lee et al. |
| 2012/0249219 | A1 | * | 10/2012 | Shoemaker .................... 327/512 |
| 2014/0059550 | A1 | * | 2/2014 | Yoshihara ..................... 718/100 |
| 2014/0095740 | A1 | * | 4/2014 | Ozawa ............................ 710/18 |
| 2014/0098404 | A1 | * | 4/2014 | Kambegawa ................. 358/1.16 |
| 2014/0108841 | A1 | * | 4/2014 | Tomi ............................. 713/323 |

* cited by examiner

*Primary Examiner* — Miya J Cato
(74) *Attorney, Agent, or Firm* — Fitzpatrick, Cella, Harper & Scinto (57) ABSTRACT

There is provided a mechanism of preferentially using a memory layer which suffers a small influence of heat of an SOC die, based on the positional relationship between the SOC die and the memory layer, and decreasing the refresh frequency of the DRAM and a leakage current. To accomplish this, an information processing apparatus allocates, in order to execute an accepted job, a memory area for executing the job preferentially from a memory physically farthest from the SOC die among a plurality of memories, and then executes the job.

9 Claims, 11 Drawing Sheets

ARRANGEMENT OF REGISTER 322

| | |
|---|---|
| MEMORY CONTROLLER OPERATION MODE SETTING REGISTER | ~401 |
| MEMORY CONTROLLER OPERATION MODE SETTING REGISTER | ~402 |
| MEMORY CONTROLLER OPERATION MODE SETTING REGISTER | ~403 |
| MEMORY CONTROLLER OPERATION MODE SETTING REGISTER | ~404 |
| MEMORY CONTROLLER OPERATION MODE SETTING REGISTER | ~405 |
| MEMORY CONTROLLER OPERATION MODE SETTING REGISTER | ~406 |
| MEMORY CONTROLLER OPERATION MODE SETTING REGISTER | ~407 |
| MEMORY CONTROLLER OPERATION MODE SETTING REGISTER | ~408 |
| MEMORY CONTROLLER OPERATION MODE SETTING REGISTER | ~409 |
| MEMORY CONTROLLER OPERATION MODE SETTING REGISTER | ~410 |
| MEMORY CONTROLLER OPERATION MODE SETTING REGISTER | ~411 |
| MEMORY CONTROLLER OPERATION MODE SETTING REGISTER | ~412 |
| MEMORY CONTROLLER OPERATION MODE SETTING REGISTER | ~413 |
| MEMORY CONTROLLER OPERATION MODE SETTING REGISTER | ~414 |
| MEMORY CONTROLLER OPERATION MODE SETTING REGISTER | ~415 |
| MEMORY CONTROLLER OPERATION MODE SETTING REGISTER | ~416 |

INFORMATION PROCESSING APPARATUS, CONTROL METHOD THEREFOR, AND COMPUTER-READABLE STORAGE MEDIUM

BACKGROUND OF THE INVENTION

1. Field of the Invention

The present invention relates to an information processing apparatus including a WideIO memory device stacked on an SOC die having a CPU, a control method for the information processing apparatus, and a computer-readable storage medium.

2. Description of the Related Art

In an existing information processing apparatus, a DRAM (Dynamic Random Access Memory) is generally used to save data for executing an OS and various applications, and to temporarily save data for executing image processing. This DRAM is used as it is connected to a CPU, an SOC, or the like. Recently, the memory bandwidth of the DRAM is increasing as information processing apparatuses become multifunctional and improve in functionality. To increase the memory bandwidth, the clock frequency of data access is raised in standards such as DDR3 or DDR4. In addition, the bandwidth is allocated by using a plurality of DRAM channels connected to a CPU or ASIC.

However, raising the clock frequency or using a plurality of memory channels poses the new problem that the power consumption increases. WideIO as the next-generation DRAM standard is presently attracting attention. WideIO is a memory technique of stacking a DRAM chip on an SOC die by adopting a 3D stacking technique using a TSV (Through Silicon Via). WideIO has the features that a high bandwidth of a maximum of 12.8 GB/sec or more is obtained with a large data width of 512 bits, and the power consumption is low because the access frequency is lowered. Furthermore, the use of the TSV can make the package thinner and smaller than that of a conventional PoP (Package on Package) structure. More specifically, as a measure against heat in a structure stacking a memory in an SOC package, a temperature sensor is integrated to change the self-refresh rate according to the temperature. Furthermore, WideIO has the feature that the 512-bit data width is divided into four 128-bit channels and these channels are controlled independently of each other. For example, it is possible to set channels 1 and 2 in a self-refresh state, and use channels 3 and 4 in a normal state. The basic structure of WideIO and a technique associated with a basic access method are proposed in U.S. Patent Application Publication No. 2012/0018885.

The aforementioned conventional technique has the following problems. That is, the multilayered structure of WideIO is susceptible to the influence of heat. For example, when a specific region of the die and the WideIO DRAM positioned above this specific region are simultaneously activated, the temperature of the activated portions locally rises. This increases a semiconductor leakage current that exponentially increases with respect to the temperature, resulting in large power consumption. The DRAM stores data by accumulating charges in the capacitor of each cell. Since, however, the capacitors are spontaneously discharged by the semiconductor leakage current, the DRAM needs to charge the capacitors by a refresh operation. Discharging depends on the temperature. That is, as the temperature is higher, the discharge speed is also higher. If, therefore, the temperature becomes higher, it is necessary to increase the refresh frequency. Consequently, the power consumption by a refresh operation increases or the access performance of the DRAM decreases because the DRAM cannot be accessed during a refresh operation.

Especially, a memory layer closest to the SOC die directly contacts the SOC die, and its temperature thus becomes very high. If, therefore, the memory layer closest to the SOC die is accessed, the adverse influence such as an increase in power consumption or a decrease in access performance becomes larger. To reduce the adverse influence due to a high temperature, it is necessary to control to preferentially access a memory layer at a low temperature.

SUMMARY OF THE INVENTION

The present invention enables realization of a mechanism of preferentially using a memory layer which suffers only a smaller influence of heat of an SOC die, based on the positional relationship between the SOC die and the memory layer, and decreasing the refresh frequency and a leakage current of a DRAM.

One aspect of the present invention provides an information processing apparatus including an SOC die having a CPU and a WideIO memory device in which a plurality of memories are stacked on the SOC die, comprising: an acceptance unit configured to accept a job; a memory control unit configured to allocate, in order to execute the job accepted by the acceptance unit, a memory area for executing the job preferentially from a memory physically farthest from the SOC die among the plurality of memories; and an execution unit configured to execute the job using the memory area allocated by the memory control unit.

Another aspect of the present invention provides an information processing apparatus including an SOC die having a CPU and a WideIO memory device in which a plurality of memories are stacked on the SOC die, comprising: an acceptance unit configured to accept a job; a determination unit configured to determine whether or not the job accepted by the acceptance unit is a job which frequently accesses an allocated memory area during execution; a memory control unit configured to allocate, if the determination unit determines that the job is a job which frequently accesses a memory area, a memory area for executing the job preferentially from a memory physically farthest from the SOC die among the plurality of memories, and allocate, if the determination unit determines that the job is not a job which frequently accesses a memory area, a memory area for executing the job preferentially from a memory physically closest to the SOC die among the plurality of memories; and an execution unit configured to execute the job using the memory area allocated by the memory control unit.

Still another aspect of the present invention provides a control method for an information processing apparatus including an SOC die having a CPU and a WideIO memory device in which a plurality of memories are stacked on the SOC die, comprising: causing an acceptance unit to accept a job; causing a memory control unit to allocate, in order to execute the job accepted in the causing the acceptance unit to accept, a memory area for executing the job preferentially from a memory physically farthest from the SOC die among the plurality of memories; and causing an execution unit to execute the job using the memory area allocated in the causing the memory control unit to allocate.

Yet still another aspect of the present invention provides a control method for an information processing apparatus including an SOC die having a CPU and a WideIO memory device in which a plurality of memories are stacked on the SOC die, comprising: causing an acceptance unit to accept a job; causing a determination unit to determine whether the job accepted in the causing the acceptance unit to accept is a job which frequently accesses an allocated memory area during execution; causing a memory control unit to allocate, if it is determined in the causing the determination unit to determine that the job is a job which frequently accesses a memory area, a memory area for executing the job preferentially from a memory physically farthest from the SOC die among the plurality of memories, and to allocate, if it is determined in the causing the determination unit to determine that the job is not a job which frequently accesses a memory area, a memory area for executing the job preferentially from a memory physically closest to the SOC die among the plurality of memories; and causing an execution unit to execute the job using the memory area allocated in the causing the memory control unit to allocate.

Still yet another aspect of the present invention provides a non-transitory computer-readable storage medium storing a computer program for causing a computer to execute each step of a control method for an information processing apparatus.

Further features of the present invention will become apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Arrangement of Information Processing Apparatus>

Figure 1:
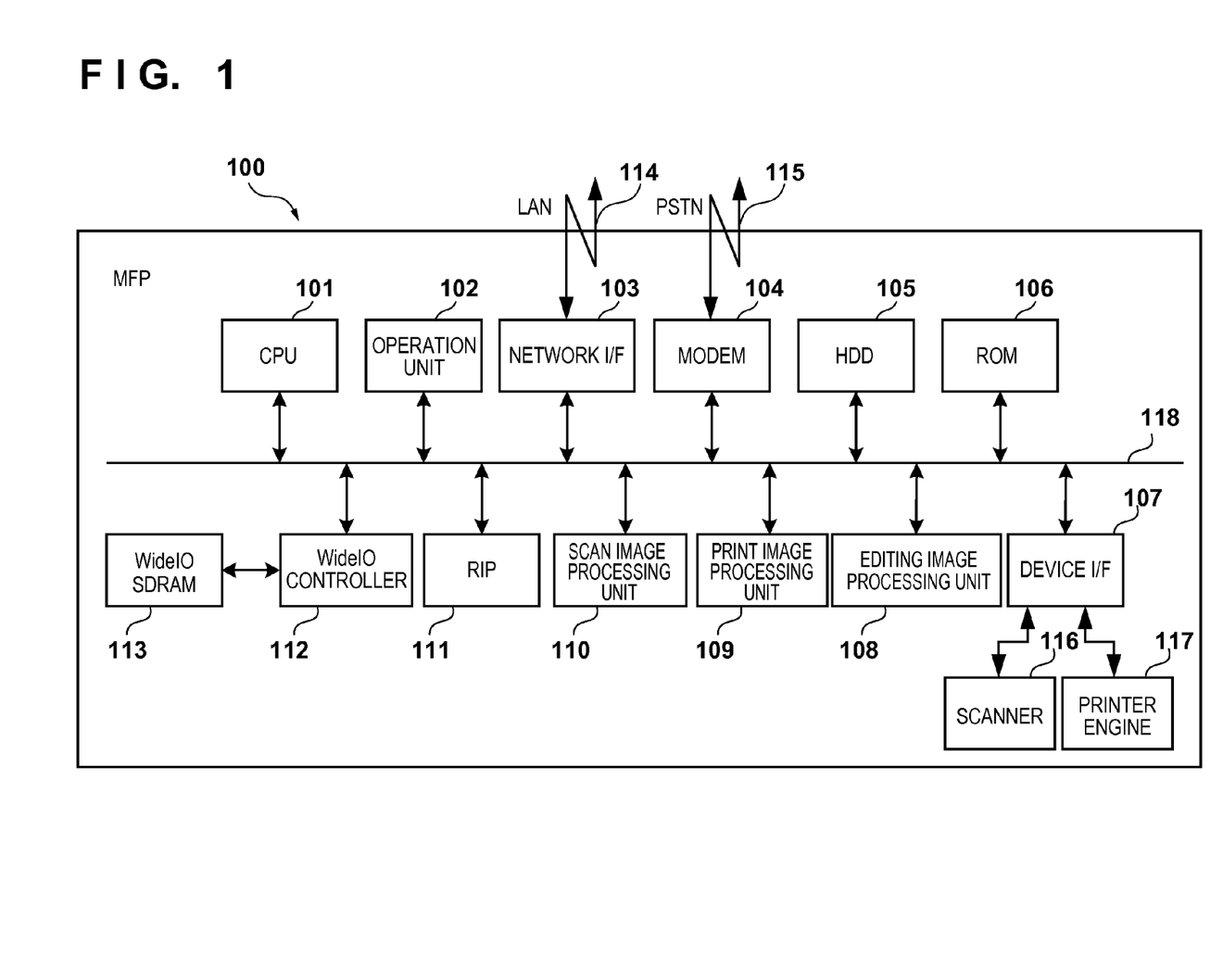
FIG. 1 is a block diagram showing the overall arrangement of an MFP (digital multifunctional peripheral) according to the first embodiment.

The overall arrangement of an MFP (digital multifunctional peripheral) according to this embodiment will be described first with reference to FIG. 1. In this embodiment, an MFP (MultiFunctional Peripheral) will be exemplified as an information processing apparatus. An MFP 100 includes a scanner 116 serving as an image input device and a printer engine 117 serving as an image output device, which are connected to a system bus 118 via a device interface (I/F) 107. Under the control of a CPU 101, the scanner 116 can read an image of a document and the printer engine 117 can perform printing. The MFP 100 is connected with a LAN 114 and a public network (PSTN) 115, via which image data and pieces of device information of external devices connected to the LAN and the public network can be input/output.

The CPU 101 controls the operation of the MFP 100 by executing a program expanded on a WideIO-SDRAM 113 from an HDD 105 by a boot program stored in a ROM 106. An operation unit 102 includes an input unit and display unit such as a keyboard and touch panel, and accepts an instruction from the user and displays a message to the user, a processing result, and the like on the display unit. A network I/F 103 is implemented by, for example, a LAN card, and inputs/outputs device information and image data to/from an external device via the LAN 114. A modem 104 inputs/outputs control information and image data to/from an external device via the public network 115. The HDD 105 is a hard disk drive and stores an OS, various application programs, input image data, and the like. The ROM 106 stores the boot program and various kinds of data. The device I/F 107 is connected with the scanner 116 and the printer engine 117 and transfers image data between the system bus 118 and the scanner 116 or printer engine 117.

An editing image processing unit 108 performs various image processes such as image data rotation and scaling, color processing, trimming/masking, binary conversion, multilevel conversion, and blank paper determination. A print image processing unit 109 performs image processing corresponding to the printer engine 117 for image data to be output to the printer engine 117. A scan image processing unit 110 performs various processes such as correction, processing, and editing for image data input from the scanner 116. A RIP (Raster Image Processor) 111 rasterizes a page description language (PDL) code into image data. A WideIO controller 112 converts, for example, a memory access command from the CPU 101 or each image processing unit into a command interpretable by the WideIO-SDRAM 113, and accesses the WideIO-SDRAM 113. The WideIO-SDRAM 113 stores programs to be executed by the CPU 101, and provides a system work memory for the operation of the CPU 101. The WideIO-SDRAM 113 also serves as an image memory for temporarily storing input image data. The system bus 118 connects the CPU 101 to each of the above-described units, and transfers control signals, data, and the like.

<Structure of WideIO-SDRAM>

Figure 2A:
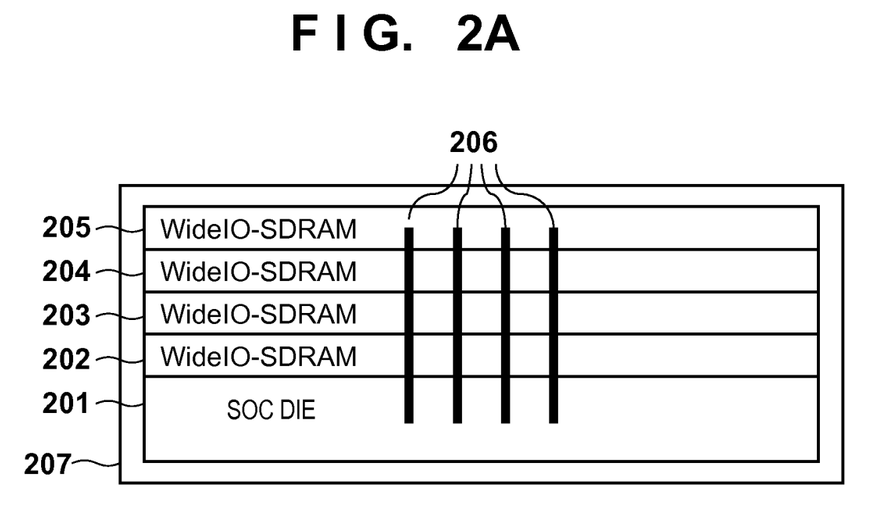
FIGS. 2A and 2B are schematic views showing the structure of a WideIO-SDRAM according to the first embodiment.
Figure 2B:
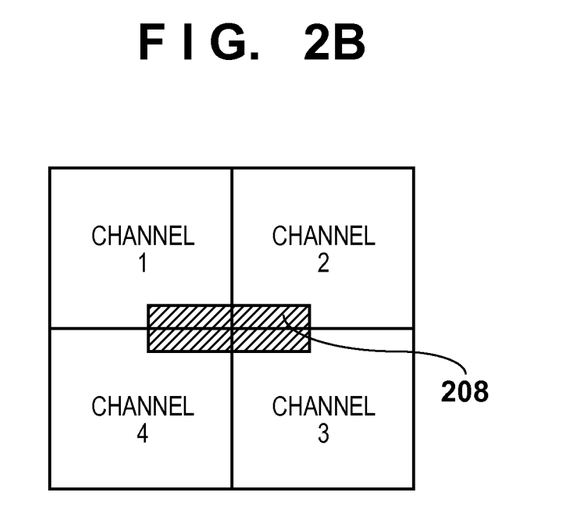

The structure of the WideIO-SDRAM 113 will be exemplified as a WideIO memory device according to the embodiment with reference to FIGS. 2A and 2B. FIG. 2A is a side view showing WideIO-SDRAMs and an SOC die from the side surface, and FIG. 2B is a plan view showing them from above.

In the first embodiment, an SOC die 201 includes, for example, the CPU 101, the device I/F 107, the RIP 111, and the image processing units 108 to 110. WideIO-SDRAMs 202 to 205 are stacked on the SOC die 201, and connected to the SOC die 201 by through silicon vias (TSVs) 206. A maximum of four WideIO-SDRAMs can be stacked in accordance with a necessary memory capacity. FIG. 2A shows an example in which four layers are stacked. An SOC package 207 contains the SOC die 201 and the WideIO-SDRAMs 202 to 205 in one package. A WideIO-SDRAM I/F 208 is positioned in the middle of the SOC die 201 and the WideIO-SDRAMs 202 to 205, as shown in FIG. 2B.

<Arrangement of WideIO Controller>

Figure 3:
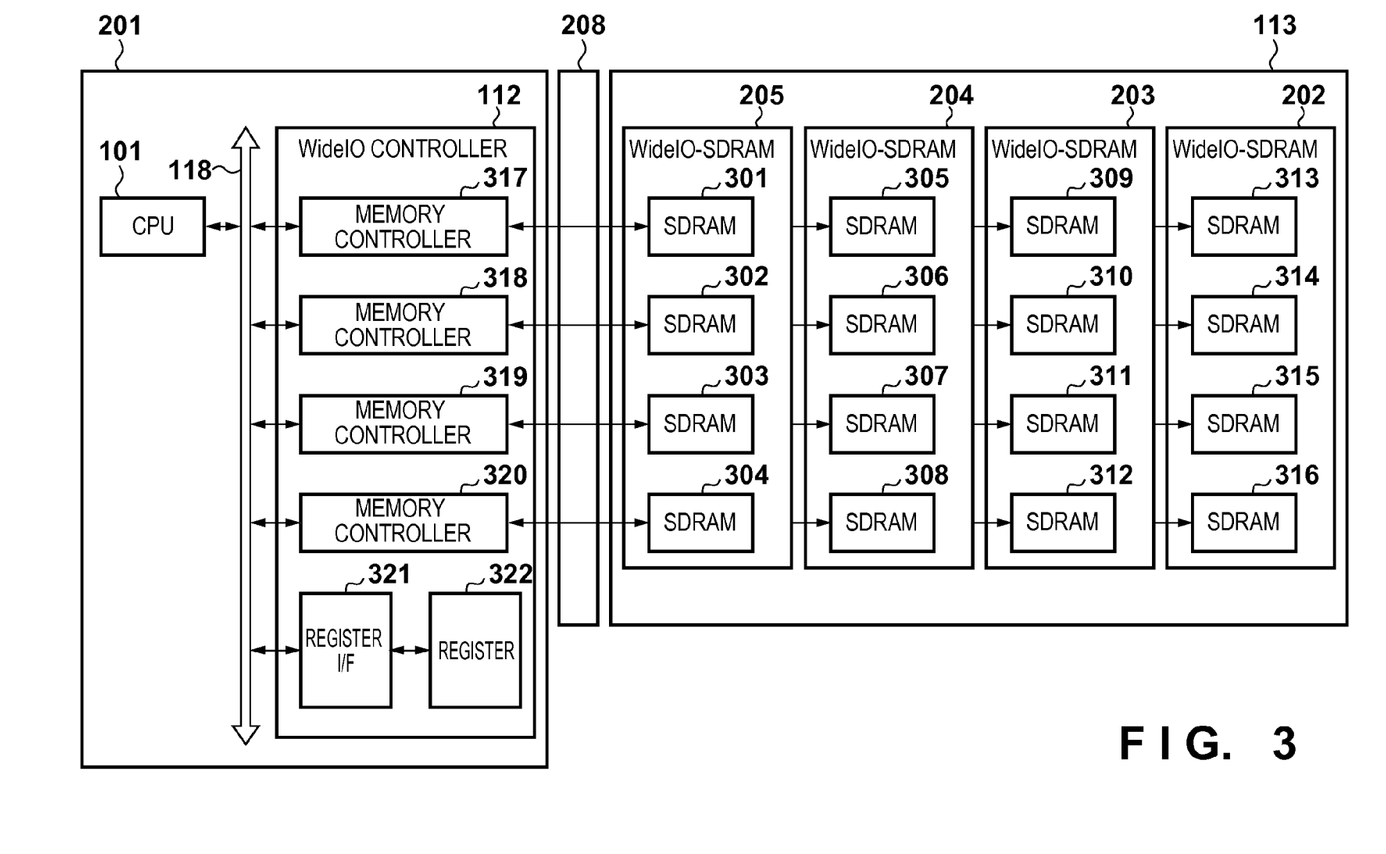
FIG. 3 is a block diagram showing the arrangement of a WideIO controller 112 according to the first embodiment.

The internal arrangement of the WideIO controller 112 according to the embodiment will be explained with reference to FIG. 3. Referring to FIG. 3, the WideIO controller 112 is connected between the system bus 118 and the WideIO-SDRAM 113, as shown in FIG. 1. Note that although the WideIO-SDRAM 205 looks as if it was physically closest to the SOC die 201 in FIG. 3, FIG. 3 does not show the physical positional relationship. The physical positional relationship between the SOC die and the WideIO-SDRAMs 205, 204, 203, and 202 will be described later with reference to FIG. 6.

Sets each consisting of four SDRAMs 301 to 304, 305 to 308, 309 to 312, or 313 to 316 are included in the WideIO-SDRAMs 205, 204, 203, and 202, respectively, and each SDRAM includes a dedicated I/F, as shown in FIG. 3. These dedicated I/Fs are equivalent to the four channels of the WideIO-SDRAMs 202 to 205 stacked on the SOC die as described above, and correspond to the WideIO-SDRAM I/F 208. Each of memory controllers 317 to 320 converts a memory access command from the system bus 118 into a command interpretable by a corresponding SDRAM, as shown in FIG. 3, and accesses the SDRAM.

The memory controller 317 controls the SDRAMs 301, 305, 309, and 313 corresponding to channel 1 of the WideIO-SDRAMs 202 to 205, and is connected to the SDRAMs via channel 1 of the WideIO-SDRAM I/F 208. The memory controller 318 controls the SDRAMs 302, 306, 310, and 314 corresponding to channel 2 of the WideIO-SDRAMs 202 to 205, and is connected to the SDRAMs via channel 2 of the WideIO-SDRAM I/F 208. The memory controller 319 controls the SDRAMs 303, 307, 311, and 315 corresponding to channel 3 of the WideIO-SDRAMs 202 to 205, and is connected to the SDRAMs via channel 3 of the WideIO-SDRAM I/F 208. The memory controller 320 controls the SDRAMs 304, 308, 312, and 316 corresponding to channel 4 of the WideIO-SDRAMs 202 to 205, and is connected to the SDRAMs via channel 4 of the WideIO-SDRAM I/F 208. A register I/F 321 serves as an interface unit for accepting register access from the CPU 101 via a register access dedicated bus (not shown). A register 322 stores pieces of operation mode setting information of the memory controllers 317 to 320, which are set from the CPU 101.

<Arrangement of Register>

Figure 4:
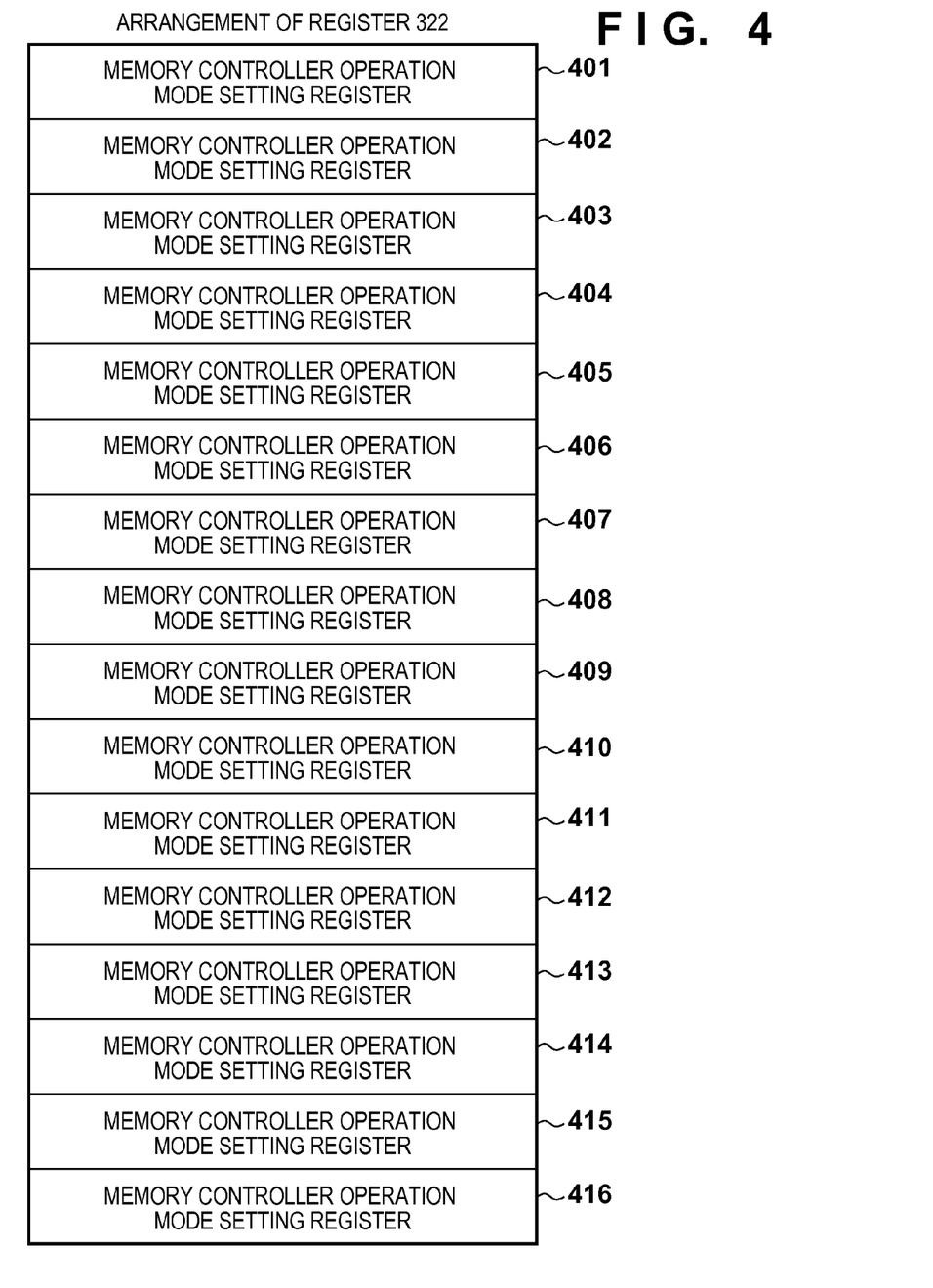
FIG. 4 is a view showing the arrangement of a register 322 according to the first embodiment.

An example of the arrangement of the register 322 will be described with reference to FIG. 4. The register 322 includes memory controller operation mode setting registers 401 to 416. The memory controller operation mode setting registers 401 to 416 are used to set the operation modes of the memory controllers 317 to 320. The memory controller operation mode setting registers 401 to 416 correspond to the SDRAMs 301 to 316, respectively.

<Allocated Address Areas of WideIO-SDRAM>

Figure 5:
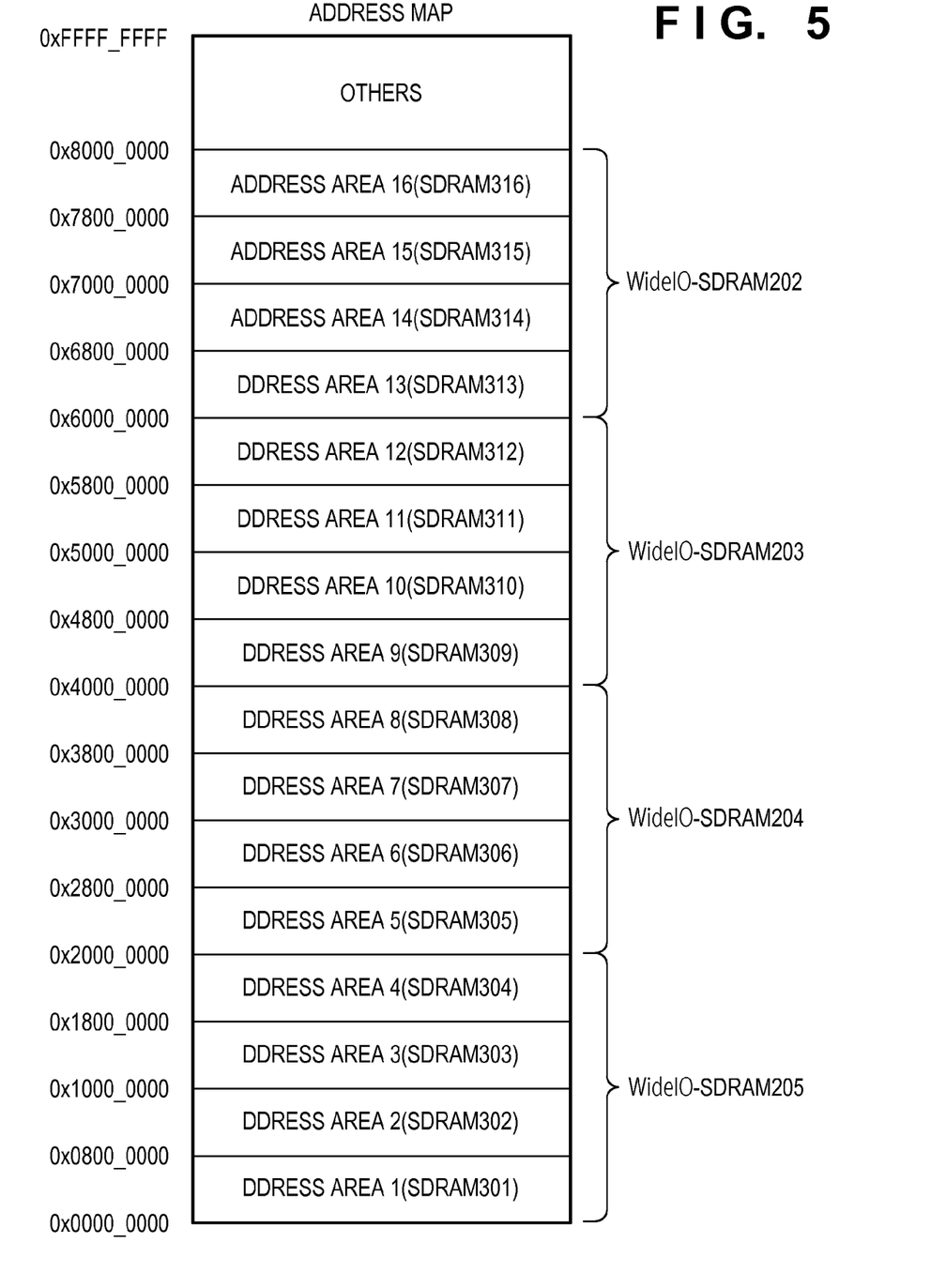
FIG. 5 is a schematic view showing the allocated addresses of the WideIO-SDRAM according to the first embodiment.

Address areas allocated to the SDRAMs 301 to 316 will be described with reference to FIG. 5. In this embodiment, as shown in FIG. 5, address areas 1 to 16 are allocated to the SDRAMs 301 to 316.

Address areas 0x0000_0000 to 0x2000_0000 are allocated to the SDRAMs 301 to 304 of the WideIO-SDRAM 205 of a memory layer (first memory layer or most significant memory layer) physically farthest from the SOC die 201. Address areas 0x2000_0000 to 0x4000_0000 are allocated to the SDRAMs 305 to 308 of the WideIO-SDRAM 204 of a memory layer (second memory layer) second farthest from the SOC die 201. Address areas 0x4000_0000 to 0x6000_0000 are allocated to the SDRAMs 309 to 312 of the WideIO-SDRAM 203 of a memory layer (third memory layer) third farthest from the SOC die 201. Address areas 0x6000_0000 to 0x8000_0000 are allocated to the SDRAMs 313 to 316 of the WideIO-SDRAM 202 of a memory layer (fourth memory layer or least significant memory layer) fourth farthest from the SOC die 201. Note that the size of each address area is not limited to that shown in FIG. 5.

<SOC Package>

The physical positional relationship between the SOC die 201 and the WideIO-SDRAMs 202 to 205 in the SOC package 207 will be described with reference to FIG. 6. The SOC die 201 includes the CPU 101, the device I/F 107, and the image processing units 108 to 110. When the plane of the SOC package is divided into four regions, the upper left, upper right, lower right, and lower left regions respectively correspond to channels 1, 2, 3, and 4 shown in FIG. 2B. Similarly, the four divided regions also correspond to the SDRAMs 301 to 304, 305 to 308, 309 to 312, or 313 to 316 shown in FIG. 3, respectively.

Figure 6:
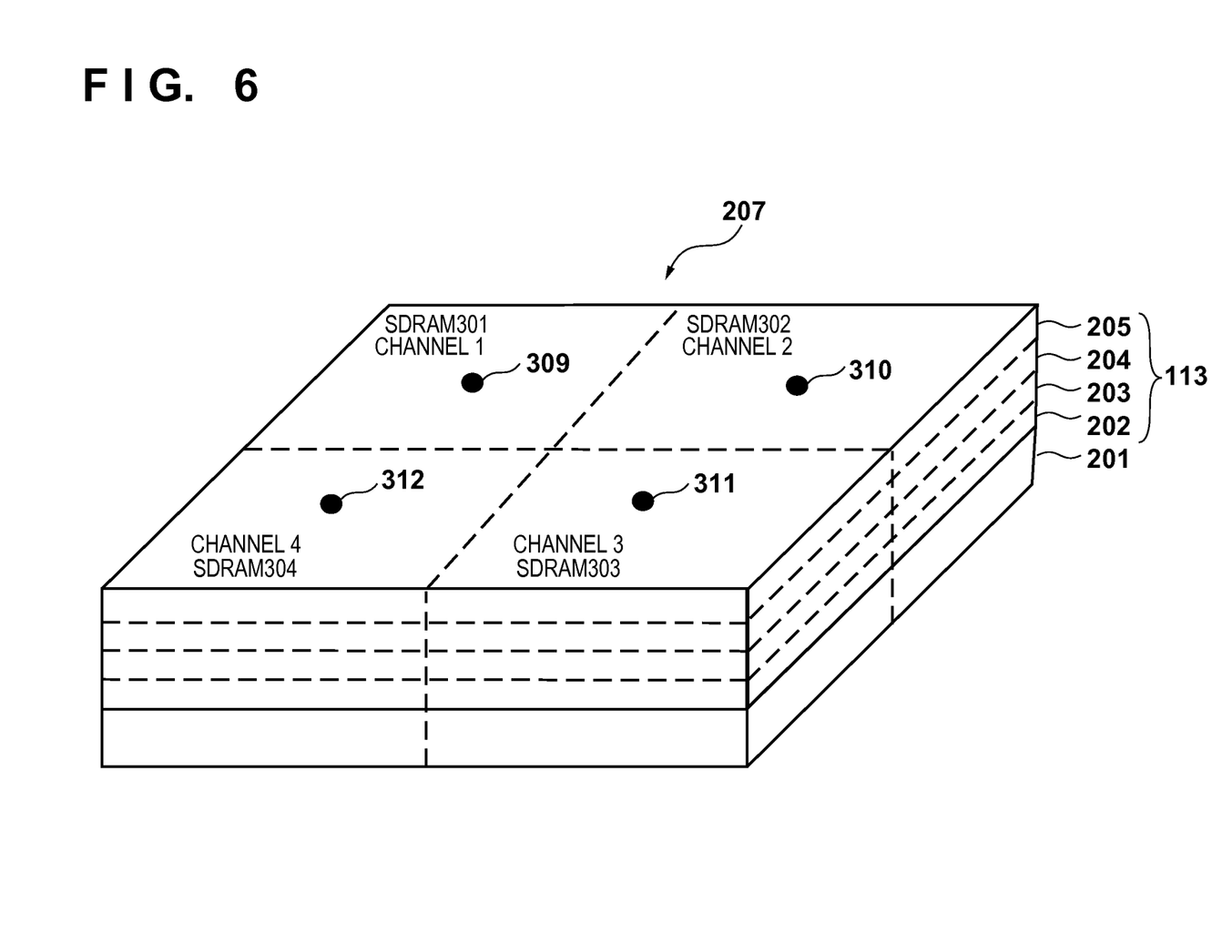
FIG. 6 is a schematic view showing the arrangement of a WideIO-SDRAM package according to the first embodiment.

As shown in FIG. 6, the WideIO-SDRAM 113 is formed by stacking a plurality of memories on the SOC die. In the embodiment, the SDRAMs 301 to 304, 305 to 308, 309 to 312, or 313 to 316 are stacked as four layers on a corresponding one of the four divided regions of the SOC die 201, as shown in FIG. 6. The SOC die 201 and the WideIO-SDRAMs 202 to 205 have the physical positional relationship such that the WideIO-SDRAM 202 is arranged closest to the SOC die 201, and the WideIO-SDRAMs 203, 204, and 205 are arranged farther away from the SOC die 201 in the order named.

<Flowchart for Deciding Memory Allocation Area>

Figure 7A:
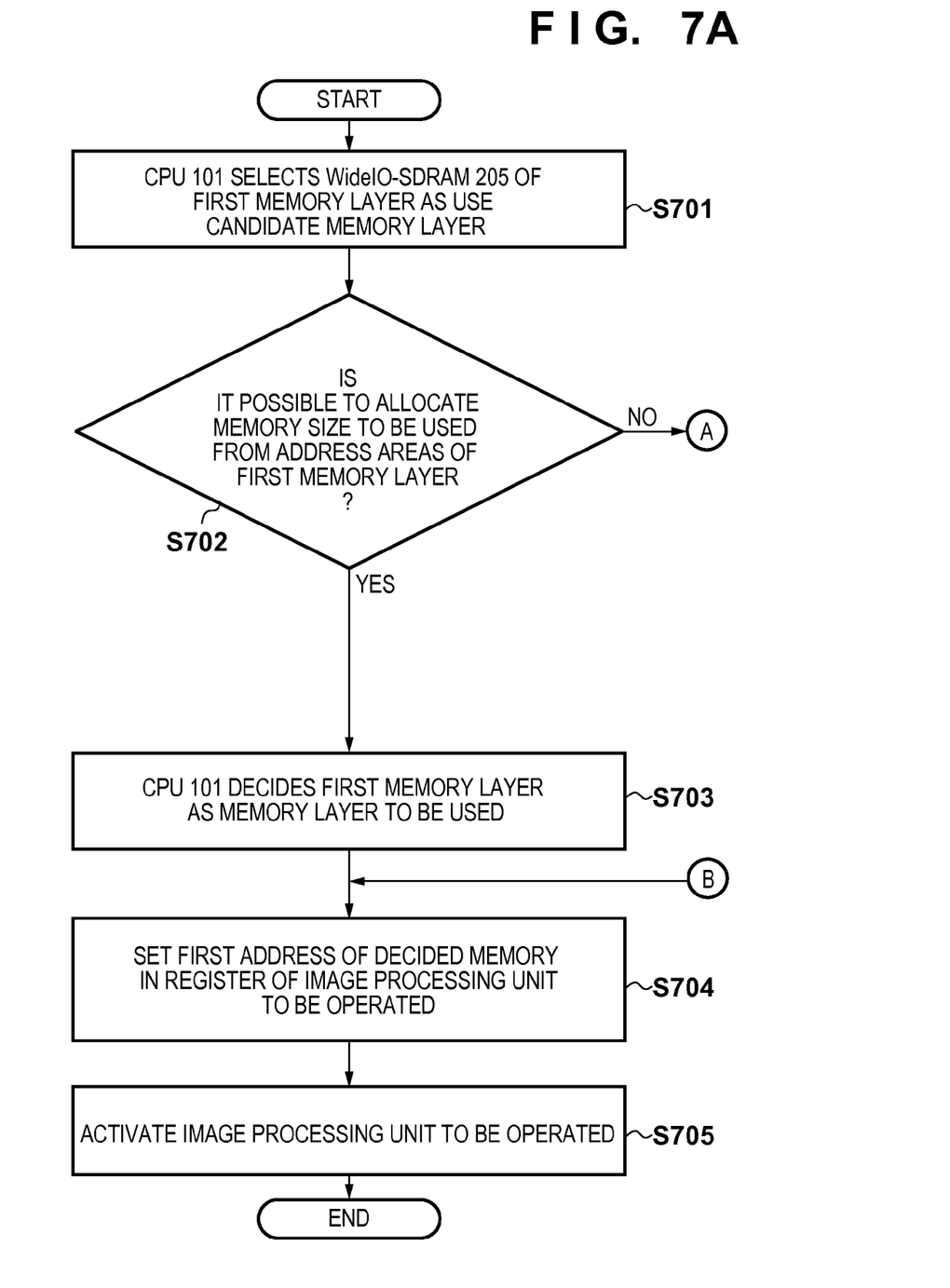
FIGS. 7A and 7B are flowcharts illustrating a processing procedure according to the first embodiment.
Figure 7B:
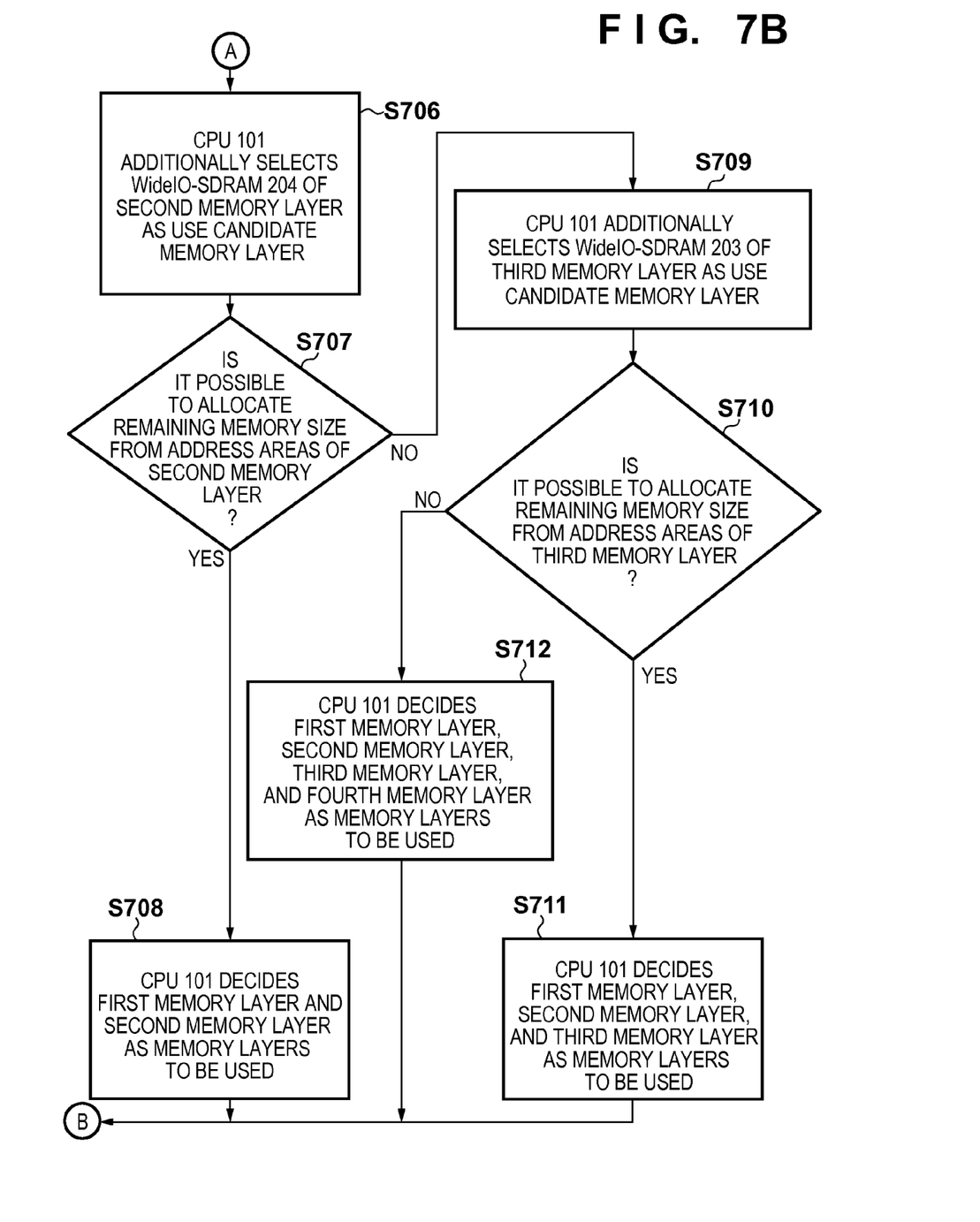

A processing procedure of deciding a memory area to be allocated to an image processing unit which needs to be operated to execute a job such as a copy or print job after accepting it will be described with reference to FIGS. 7A and 7B. That is, this flowchart is performed after the CPU 101 accepts a job and before the CPU 101 executes the job. Note that the processing to be described below is implemented when the CPU 101 reads out a control program stored in advance in the ROM 106, the HDD 105, or the like to the WideIO-SDRAM 113, and executes it.

In step S701, the CPU 101 selects the WideIO-SDRAM 205 of the first memory layer as a use candidate memory layer. That is, the CPU 101 selects, as a use candidate memory layer, the WideIO-SDRAM 205 of the memory layer (most significant memory layer in this embodiment) farthest from the SOC die 201. In step S702, the CPU 101 determines whether it is possible to allocate, from the address areas of the SDRAMs of the first memory layer, a memory area of a memory size required by an image processing unit to be operated. That is, the CPU 101 determines whether it is possible to allocate the memory size required by the image processing unit from areas 0x0000_0000 to 0x2000_0000 allocated to the WideIO-SDRAM 205. If it is determined that it is possible to allocate the required memory size, the process advances to step S703; otherwise, the process advances to step S706.

Management of memory allocation area (confirmation of a free area) will be explained. In the embodiment, the CPU 101 manages allocation of a memory area to be used by a job to be executed. The CPU 101 checks whether all the addresses of the address areas of the selected memory layer have already been allocated by a job. In the embodiment, allocation of the memory area is managed by creating an allocation table for all the addresses by software, and confirming the allocation state of the addresses based on the allocation table, as is commonly known. The CPU 101 checks the allocation state by referring to the allocation table. If addresses for the memory area required by the image processing unit to be operated are still available, it is determined that it is possible to allocate the memory size. More specifically, if the CPU 101 determines that it is possible to allocate the necessary memory size from the memory area allocated to the WideIO-SDRAM 205, in step S703 it decides the first memory layer as a memory layer to be used.

Management of memory allocation area (decision of a memory to be used) will now be described. In the embodiment, the CPU 101 decides a memory layer to be used. If the CPU 101 determines that it is possible to allocate the memory size from the address areas of the use candidate memory layer, it decides the use candidate memory layer as a memory layer to be used. First, the CPU 101 allocates the memory size from the address areas of the first memory layer. The CPU 101 refers to the allocation table, and updates it to allocate addresses to be used from address areas which are not currently allocated. The CPU 101 then makes settings in the memory controller operation mode setting registers 401 to 416 of the memory controllers 317 to 320 to perform memory access to the decided memory layer. In step S703, the CPU 101 makes settings in the memory controller operation mode setting registers 401 to 404 corresponding to the WideIO-SDRAM 205 to allow memory access to the SDRAMs 301 to 304.

In step S704, the CPU 101 sets the first address of the allocated memory area in the register of the image processing unit to be operated. Processing of using the memory area in the image processing unit will be briefly explained. The image processing unit includes various filtering processes to be performed in, for example, a smoothing process and image region determination process. In the filtering process, it is normally necessary to store image data input in a raster format by the number of lines corresponding to the window width of the filter. In the embodiment, a buffer for storing the image data of the number of lines is implemented by using the area of the WideIO-SDRAM. In step S705, the CPU 101 activates the image processing unit to be operated, and performs, for example, image processing necessary for the job designated by the operation unit or the like. The activation of the image processing unit means, for example, setting the setting value of the enable register of the image processing unit in an enable state.

On the other hand, if the CPU 101 determines in step S702 that it is impossible to allocate the necessary memory size from the memory area allocated to the WideIO-SDRAM 205, the process advances to step S706. In step S706, the CPU 101 additionally selects the WideIO-SDRAM 204 of the second memory layer as a use candidate memory layer. In step S707, the CPU 101 determines whether it is possible to allocate, from the address areas of the second memory layer, the memory area of the remaining memory size obtained by subtracting the available size in the first memory layer from the memory size required by the image processing unit to be operated. That is, the CPU 101 determines whether it is possible to allocate the remaining memory size required by the image processing unit from areas 0x2000_0000 to 0x4000_0000 allocated to the WideIO-SDRAM 204.

If the CPU 101 determines that it is possible to allocate the necessary memory size from the memory area allocated to the WideIO-SDRAM 204, it advances the process to step S708 to decide the first and second memory layers as memory layers to be used. Note that if it is impossible to allocate the whole area of the first memory layer, only the second memory layer is decided as a memory layer to be used. In step S708, the CPU 101 makes settings in the memory controller operation mode setting registers 401 to 408 corresponding to the WideIO-SDRAMs 204 and 205 to allow memory access to the SDRAMs 301 to 308. After that, the process advances to steps S704 and S705. The processes in steps S704 and S705 have been described above and a description thereof will be omitted.

On the other hand, if the CPU 101 determines in step S707 that it is possible to allocate the necessary memory size from the memory area allocated to the WideIO-SDRAM 204, it advances the process to step S709. In step S709, the CPU 101 additionally selects the WideIO-SDRAM 203 of the third memory layer as a use candidate memory layer. In step S710, the CPU 101 determines whether it is possible to allocate, from the address areas of the third memory layer, the memory area of the remaining memory size obtained by subtracting the available size in the first and second memory layers from the memory size required by the image processing unit to be operated. That is, the CPU 101 determines whether it is possible to allocate the remaining memory size required by the image processing unit from areas 0x4000_0000 to 0x6000_0000 allocated to the WideIO-SDRAM 203.

If the CPU 101 determines that it is possible to allocate the necessary memory size from the memory area allocated to the WideIO-SDRAM 203, it advances the process to step S711 to decide the first, second, and third memory layers as memory layers to be used. Note that if it is impossible to allocate the whole area of the first layer or that of the second memory layer, the CPU 101 decides, as a memory layer to be used, the first and third memory layers, the second and third memory layers, or only the third memory area. In step S711, the CPU 101 makes settings in the memory controller operation mode setting registers 401 to 412 corresponding to the WideIO-SDRAMs 203 to 205 to allow memory access to the SDRAMs 301 to 312. After that, the process advances to steps S704 and S705. The processes in steps S704 and S705 have been described above and a description thereof will be omitted.

On the other hand, if the CPU 101 determines in step S710 that it is impossible to allocate the necessary memory size from the memory area allocated to the WideIO-SDRAM 203, it advances the process to step S712. In step S712, the CPU 101 decides the first, second, third, and fourth memory layers as memory layers to be used. Note that if it is impossible to allocate the whole area of the first memory layer, that of the second memory layer, or that of the third memory area, a combination of memory layers whose areas are available is decided, as described in step S711. In step S712, the CPU 101 makes settings in the memory controller operation mode setting registers 401 to 416 corresponding to the WideIO-SDRAMs 202 to 205 to allow memory access to the SDRAMs 301 to 316. The CPU 101 allocates the remaining memory size required by the image processing unit from areas 0x6000_0000 to 0x8000_0000 allocated to the WideIO-SDRAM 202. After that, the process advances to steps S704 and S705. The processes in steps S704 and S705 have been described above and a description thereof will be omitted.

As described above, according to the embodiment, the memory area required by the image processing unit which needs to be operated to execute the job is allocated preferentially from the memory layer farthest from the SOC die 201. In this embodiment, therefore, it is possible to perform data processing using a WideIO-SDRAM at a lower temperature among the plurality of WideIO-SDRAMs, thereby decreasing the power consumption and suppressing a decrease in memory access performance. That is, a memory layer suffering a smallest influence of heat of the SOC and having a largest cooling effect of a heat sink or the like can be used, and the number of DRAMs in which the temperature locally rises decreases, thereby decreasing the refresh frequency of the DRAM and a leakage current. It is thus possible to decrease the power consumption and suppress a decrease in access performance of the WideIO DRAM as much as possible.

Second Embodiment

Figure 8A:
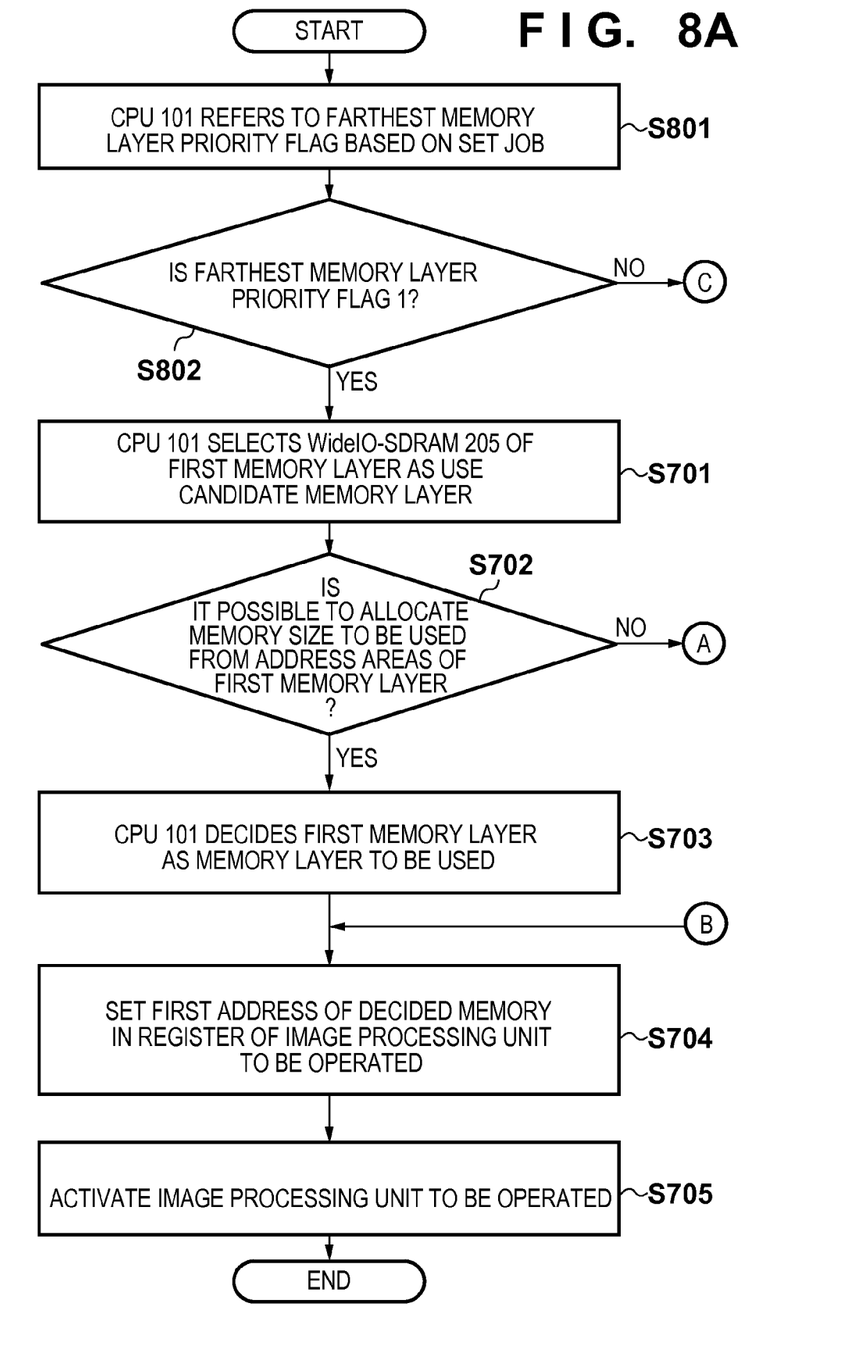
FIGS. 8A to 8C are flowcharts illustrating a processing procedure according to the second embodiment.
Figure 8B:
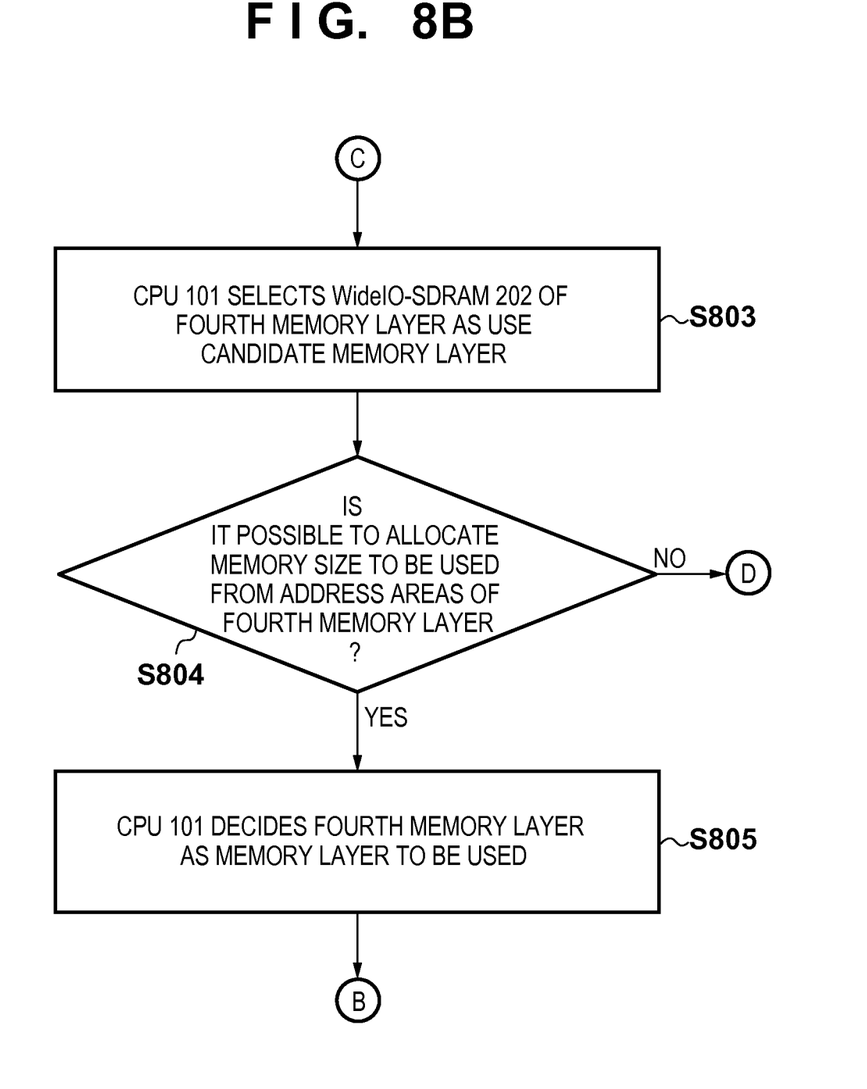
Figure 8C:
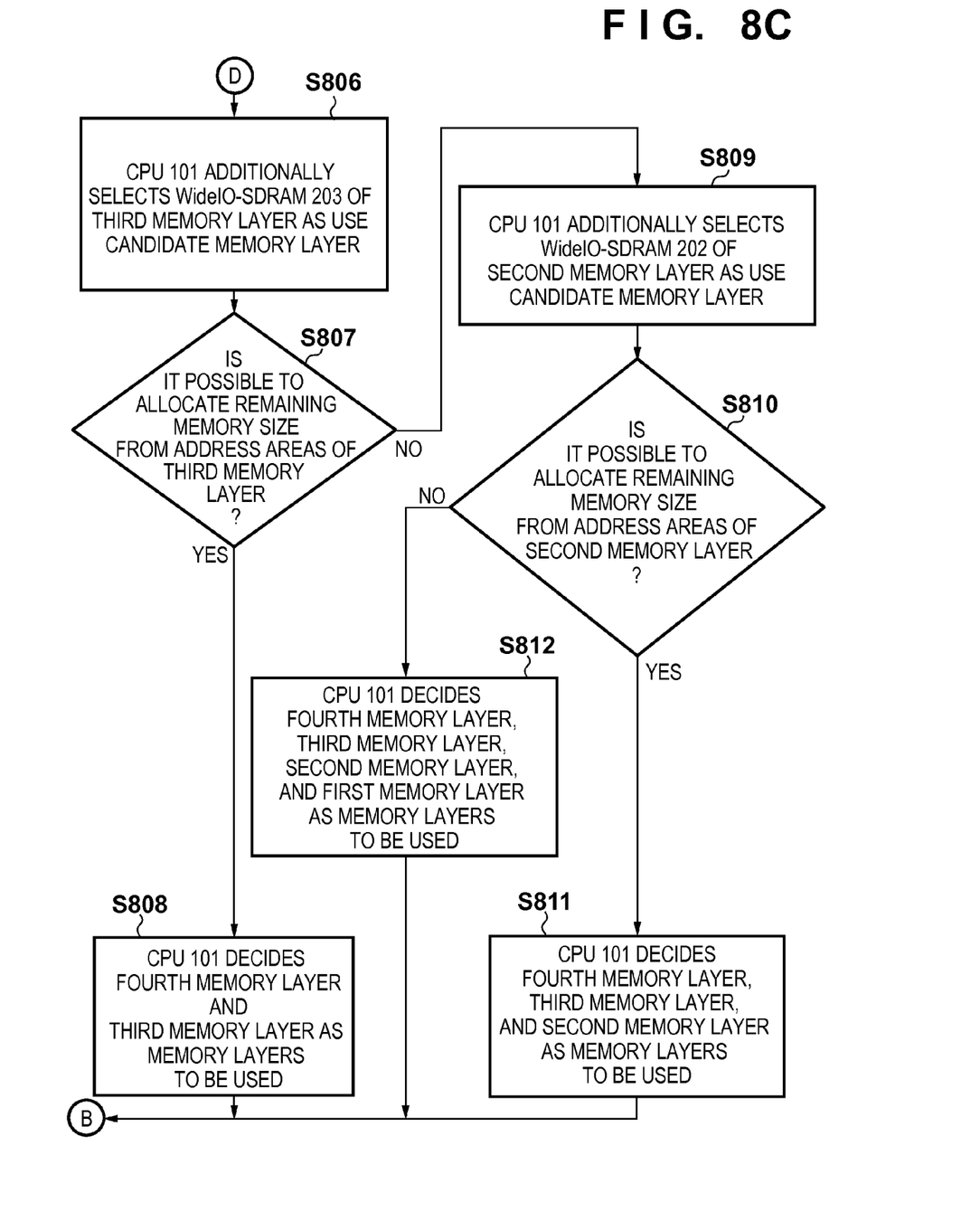

The second embodiment of the present invention will be described with reference to FIGS. 8A to 8C. In the aforementioned first embodiment, a case in which a memory layer (WideIO-SDRAM 205) physically farthest from the SOC die 201 is preferentially used to execute a job set in a data processing apparatus has been explained. Since, however, the use frequency of the memory changes depending on the contents of a set job, the power consumption by memory access and the processing speed (performance) also change. Since the required power consumption and processing speed are different depending on the contents of a job, it may be necessary to control to use different memory layers depending on set job processing.

For example, the memory capacities of WideIO-SDRAMs 202 to 205 are limited. If, therefore, a plurality of jobs need to be simultaneously processed, it may not be possible to allocate the whole memory area to be used from a memory layer farthest from an SOC die 201. In consideration of such case, in this embodiment, it is controlled according to the contents of a job whether to preferentially use the farthest memory layer (WideIO-SDRAM 205) or the closest memory layer (WideIO-SDRAM 202).

A processing procedure of deciding a memory area according to this embodiment will be described with reference to FIGS. 8A to 8C. For the sake of descriptive convenience, the same step reference symbols as those in the first embodiment denote the same processing steps. Note that the processing to be described below is implemented when a CPU 101 reads out a control program stored in advance in a ROM 106, an HDD 105, or the like to a WideIO-SDRAM 113, and executes it.

In step S801, the CPU 101 refers to a farthest memory layer priority flag based on the contents of a set job. The farthest memory layer priority flag is stored in a farthest memory layer priority flag table. The farthest memory layer priority flag table holds, for each job, information of the farthest memory layer priority flag of 1 bit which is used to determine whether to preferentially use the memory layer farthest from the SOC die 201. If the farthest memory layer (WideIO-SDRAM 205) is preferentially used, the farthest memory layer priority flag is set to 1. Alternatively, if the closest memory layer (WideIO-SDRAM 202) is preferentially used, the farthest memory layer priority flag is set to 0. In this embodiment, the farthest memory layer priority flag is set, in advance, to 1 for a job with a high memory use frequency during execution or 0 for a job with a low memory use frequency during execution. Since a job with a high memory use frequency frequently accesses an allocated memory area during execution, a memory area is preferentially allocated from the farthest memory layer in this embodiment.

In step S802, the CPU 101 switches processing to be performed next depending on whether the value of the farthest memory layer priority flag is 1. The CPU 101 controls so that, if the farthest memory layer priority flag is 1, the process advances to step S701, and, if the farthest memory layer priority flag is 0, the process advances to step S803. The processing contents in steps S701 to S712 are the same as those of FIGS. 7A and 7B described in the first embodiment and a description thereof will be omitted.

On the other hand, if the farthest memory layer priority flag is 0, in step S803 (FIG. 8B) the CPU 101 selects the WideIO-SDRAM 202 of the fourth memory layer as a use candidate memory layer. That is, the CPU 101 selects, as a use candidate memory layer, the WideIO-SDRAM 202 of the memory layer (least significant memory layer) closest to the SOC die 201. After that, in step S804, the CPU 101 determines whether it is possible to allocate, from the address areas of the SDRAMs of the fourth memory layer, a memory area of a memory size required by an image processing unit to be operated. That is, the CPU 101 determines whether it is possible to allocate the memory size required by the image processing unit from areas 0x6000_0000 to 0x8000_0000 allocated to the WideIO-SDRAM 202.

If the CPU 101 determines that it is possible to allocate the necessary memory size from the memory area allocated to the WideIO-SDRAM 202, in step S805 it decides the fourth memory layer as a memory layer to be used. If the CPU 101 determines that it is possible to allocate the memory size from the address areas of the use candidate memory layer, it decides the use candidate memory layer as a memory layer to be used. In step S805, the CPU 101 makes settings in memory controller operation mode setting registers 413 to 416 corresponding to the WideIO-SDRAM 202 to allow memory access to SDRAMs 313 to 316. After that, the process advances to steps S704 and S705. The processes in steps S704 and S705 have been described above and a description thereof will be omitted.

If it is determined in step S804 that it is impossible to allocate the necessary memory size from the memory area allocated to the WideIO-SDRAM 202, the process advances to step S806. In step S806 (FIG. 8C), the CPU 101 additionally selects the WideIO-SDRAM of the third memory layer as a use candidate memory layer. That is, in this embodiment, the CPU 101 additionally selects the WideIO-SDRAM 203 of the third memory layer.

In step S807, the CPU 101 determines whether it is possible to allocate, from the address areas of the third memory layer, the memory area of the remaining memory size obtained by subtracting the available size in the fourth memory layer from the memory size required by the image processing unit to be operated. That is, the CPU 101 determines whether it is possible to allocate the remaining memory size required by the image processing unit from areas 0x4000_0000 to 0x6000_0000 allocated to the WideIO-SDRAM 203. If the CPU 101 determines that it is possible to allocate the necessary memory size from the memory area allocated to the WideIO-SDRAM 203, in step S808 it decides the third and fourth memory layers as memory layers to be used. In step S808, the CPU 101 makes settings in memory controller operation mode setting registers 409 to 416 corresponding to the WideIO-SDRAMs 202 and 203 to allow memory access to SDRAMs 309 to 316. After that, the process advances to steps S704 and S705. The processes in steps S704 and S705 have been described above and a description thereof will be omitted.

If the CPU 101 determines in step S807 that it is impossible to allocate the necessary memory size from the memory area allocated to the WideIO-SDRAM 203, the process advances to step S809. In step S809, the CPU 101 additionally selects the WideIO-SDRAM of the second memory layer as a use candidate memory layer. That is, in this embodiment, the CPU 101 additionally selects the WideIO-SDRAM 204 of the second memory layer.

In step S810, the CPU 101 determines whether it is possible to allocate, from the address areas of the second memory layer, the memory area of the remaining memory size obtained by subtracting the available size in the third and fourth memory layers from the memory size required by the image processing unit to be operated. That is, the CPU 101 determines whether it is possible to allocate the remaining memory size required by the image processing unit from areas 0x2000_0000 to 0x4000_0000 allocated to the WideIO-SDRAM 204.

If the CPU 101 determines that it is possible to allocate the necessary memory size from the memory area allocated to the WideIO-SDRAM 204, in step S811 it decides the second, third, and fourth memory layers as memory layers to be used. In step S811, the CPU 101 makes settings in memory controller operation mode setting registers 405 to 416 corresponding to the WideIO-SDRAMs 202 to 204 to allow memory access to SDRAMs 305 to 316. After that, the process advances to steps S704 and S705. The processes in steps S704 and S705 have been described above and a description thereof will be omitted.

If the CPU 101 determines in step S810 that it is impossible to allocate the necessary memory size from the memory area allocated to the WideIO-SDRAM 204, the process advances to step S812. In step S812, the CPU 101 decides the first, second, third, and fourth memory layers as memory layers to be used. In step S812, the CPU 101 makes settings in memory controller operation mode setting registers 401 to 416 corresponding to the WideIO-SDRAMs 202 to 205 to allow memory access to SDRAMs 301 to 316.

The CPU 101 allocates, from areas 0x0000_0000 to 0x2000_0000 allocated to the WideIO-SDRAM 205, the remaining memory size obtained by subtracting the available size in the second, third, and fourth memory layers from the memory size required by the image processing unit. After that, the process advances to steps S704 and S705. The processes in steps S704 and S705 have been described above and a description thereof will be omitted. Note that in steps S803, S806, and S809, if a target memory layer has no more available memory area, the CPU 101 need not select the target memory layer as a use candidate memory layer.

As described above, according to this embodiment, it is possible to switch between the farthest memory layer and the closest memory layer to be preferentially used to allocate a memory area required by an image processing unit which needs to be operated to execute a job. Therefore, a job which does not require a high memory access speed or a job which has a low access frequency and thus causes almost no problem in terms of the power consumption due to the influence of heat is controlled to be preferentially allocated to a closer memory layer.

Even if various jobs using the WideIO-SDRAMs exist, it is possible to preferentially allocate a job which has a high access frequency and is susceptible to heat to a memory layer farther from the SOC die 201. In this embodiment, therefore, data processing can be performed using a WideIO-SDRAM at a lower temperature among the plurality of WideIO-SDRAMs, thereby decreasing the power consumption and suppressing a decrease in memory access performance.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-268806 filed on Dec. 7, 2012, which is hereby incorporated by reference herein in its entirety.

What is claimed is:

1. An information processing apparatus including an SOC die having a CPU and a WideIO memory device in which a plurality of memories are stacked on said SOC die, comprising:
    an acceptance unit configured to accept a job;
    a memory control unit configured to allocate, in order to execute the job accepted by said acceptance unit, a memory area for executing the job preferentially from a memory physically farthest from said SOC die among the plurality of memories; and
    an execution unit configured to execute the job using the memory area allocated by said memory control unit.

2. The apparatus according to claim 1, wherein
    if it is impossible to allocate, from one memory, a memory area necessary for executing the job, said memory control unit allocates the memory area from a plurality of memories.

3. An information processing apparatus including an SOC die having a CPU and a WideIO memory device in which a plurality of memories are stacked on said SOC die, comprising:
    an acceptance unit configured to accept a job;
    a determination unit configured to determine whether or not the job accepted by said acceptance unit is a job which frequently accesses an allocated memory area during execution;
    a memory control unit configured to allocate, if said determination unit determines that the job is a job which frequently accesses a memory area, a memory area for executing the job preferentially from a memory physically farthest from said SOC die among the plurality of memories, and allocate, if said determination unit determines that the job is not a job which frequently accesses a memory area, a memory area for executing the job preferentially from a memory physically closest to said SOC die among the plurality of memories; and
    an execution unit configured to execute the job using the memory area allocated by said memory control unit.

4. The apparatus according to claim 3, further comprising a table that stores a flag indicating, for each job, whether or not the job accepted by said acceptance unit is a job which frequently accesses an allocated memory area during execution,
    wherein said determination unit refers to the flag to determine whether the job is a job which frequently accesses an allocated memory area.

5. The apparatus according to claim 3, wherein said execution unit simultaneously executes a plurality of jobs.

6. A control method for an information processing apparatus including an SOC die having a CPU and a WideIO memory device in which a plurality of memories are stacked on said SOC die, comprising:
    causing an acceptance unit to accept a job;
    causing a memory control unit to allocate, in order to execute the job accepted in the causing the acceptance unit to accept, a memory area for executing the job preferentially from a memory physically farthest from said SOC die among the plurality of memories; and causing an execution unit to execute the job using the memory area allocated in the causing the memory control unit to allocate.

7. A non-transitory computer-readable storage medium storing a computer program for causing a computer to execute each step of a control method for an information processing apparatus according to claim 6.

8. A control method for an information processing apparatus including an SOC die having a CPU and a WideIO memory device in which a plurality of memories are stacked on said SOC die, comprising:

causing an acceptance unit to accept a job;

causing a determination unit to determine whether the job accepted in the causing the acceptance unit to accept is a job which frequently accesses an allocated memory area during execution;

causing a memory control unit to allocate, if it is determined in the causing the determination unit to determine that the job is a job which frequently accesses a memory area, a memory area for executing the job preferentially from a memory physically farthest from said SOC die among the plurality of memories, and to allocate, if it is determined in the causing the determination unit to determine that the job is not a job which frequently accesses a memory area, a memory area for executing the job preferentially from a memory physically closest to said SOC die among the plurality of memories; and causing an execution unit to execute the job using the memory area allocated in the causing the memory control unit to allocate.

9. A non-transitory computer-readable storage medium storing a computer program for causing a computer to execute each step of a control method for an information processing apparatus according to claim 8.

* * * * *